A. PANGBURN.
WEIGHING-SCALES.
No. 181,099.  Patented Aug. 15, 1876.
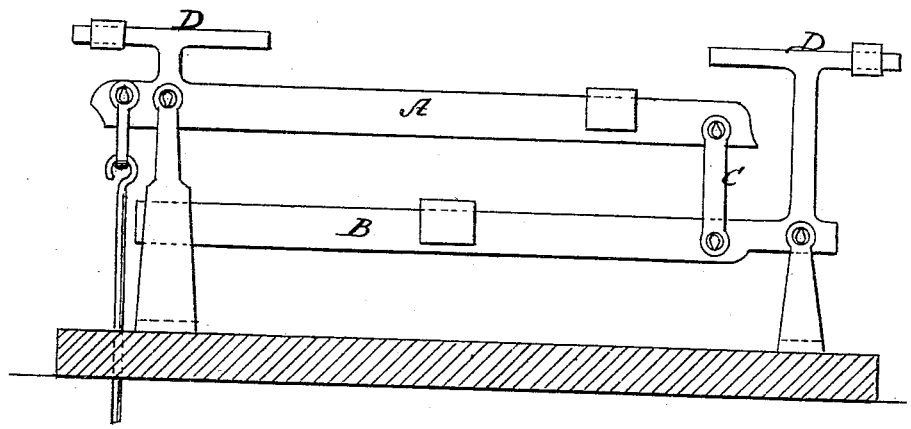

UNITED STATES PATENT OFFICE.

ALONZO PANGBURN, OF FREMONT, OHIO.

IMPROVEMENT IN WEIGHING-SCALES.

Specification forming part of Letters Patent No. 181,099, dated August 15, 1876; application filed March 13, 1876.

*To all whom it may concern:*

Be it known that I, ALONZO PANGBURN, of Fremont, in the county of Sandusky and State of Ohio, have invented a new and Improved Weighing-Scale, of which the following is a specification:

My invention consists of one or more beams, in combination with the ordinary beam, connected by suspending the short arm of the additional beam to the long arm of the preceding one, under which it is located, in such manner that the range of the scale can be increased to any extent required. It also consists of a secondary beam to the principal beam for weighing small articles.

The drawing is a side elevation of my improved scale.

A is the beam, from which the platform, or other device for holding the weight, is suspended in the ordinary way. B represents an additional beam, which I propose to apply by locating it under A, and suspending it from the long arm by link C; and in like manner I will suspend another from the free end of B, and so on as many times as required, for whatever capacity may be desired.

Over the fulcrum of each scale-beam A B are arranged two equal arms of a scale, D. The latter, like the scale-beams A B, is provided with a sliding weight, whereby the fractions between the notated numbers on beams A B may be readily obtained.

Having thus described all that is necessary to a full understanding of my invention, what I claim is—

A weighing-scale having the scale-lever B connected near its fulcrum with the end of the long arm of the ordinary scale-lever A by a link, C, each lever being provided with an auxiliary scale, D, as and for the purpose specified.

ALONZO PANGBURN.

Witnesses:
E. F. DICKINSON,
H. B. SMITH.